M. L. HANLIN & E. B. ROSS.
DRILL.
APPLICATION FILED JULY 15, 1910.
988,092.
Patented Mar. 28, 1911.
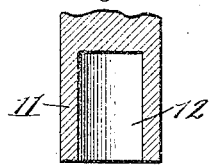
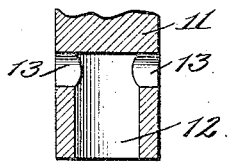
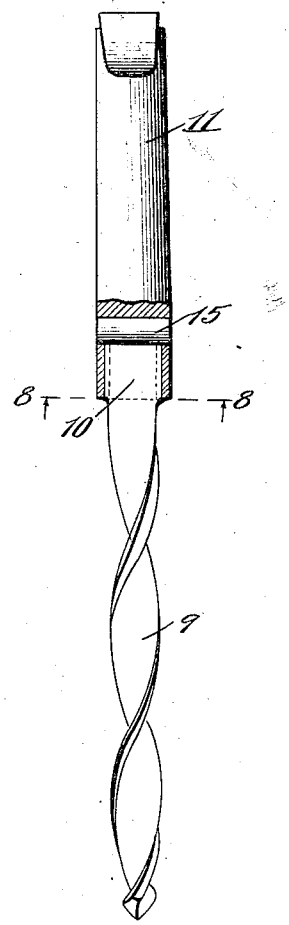
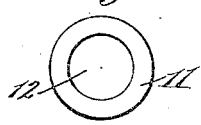
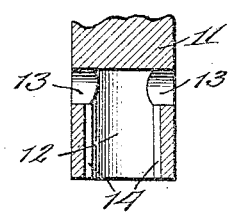
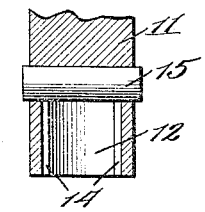
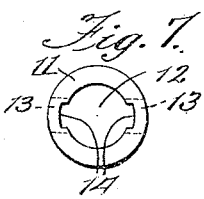
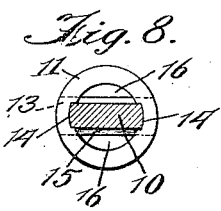
Witnesses:
Inventors.
Merton L. Hanlin
Edwin B. Ross,
by Bond Adams Pickard Jackson,
Attys

UNITED STATES PATENT OFFICE.

MERTON L. HANLIN AND EDWIN B. ROSS, OF BUCHANAN, MICHIGAN, ASSIGNORS TO CELFOR TOOL COMPANY, OF CHICAGO, ILLINOIS, A CORPORATION OF ILLINOIS.

DRILL.

988,092.

Specification of Letters Patent.   Patented Mar. 28, 1911.

Original application filed November 22, 1909, Serial No. 529,393. Divided and this application filed July 15, 1910. Serial No. 572,162.

*To all whom it may concern:*

Be it known that we, MERTON L. HANLIN and EDWIN B. ROSS, citizens of the United States, residing at Buchanan, in the county of Berrien and State of Michigan, have invented a new and Improved Drill, of which the following is a specification, reference being had to the accompanying drawings.

Our invention relates to drills, and has to do particularly with drills made of high-speed steel.

As is well understood by those familiar with the art, high-speed steel is very expensive as compared with ordinary steel, and for that reason it is very desirable that only the cutting part of drills, reamers, and similar tools, be made of high-speed steel, and that the shank or holding part by which the drill is held in the chuck or the holder be made of cheaper steel. This is particularly true in the case of drills having tapered shanks, in which a considerable amount of metal is required for forming the shank, and heretofore various expedients have been employed to provide what may be termed a "composite" drill, the cutting part or drill proper being made of high-speed steel, while the shank or holding part is made of a cheaper grade of material. So far as we are aware, none of such efforts have been entirely successful owing to the difficulty of properly joining the two parts of the drill so that they may successfully resist the very severe strains to which they are put. By our invention, which forms the subject-matter of this application, we provide a way of making such a composite drill which avoids all the objections to prior constructions, with the result that our improved drill is equally as efficient as a drill made throughout of high-speed steel and at the same time is much more economical of manufacture because the high-speed steel is used only for the drill proper or cutting portion of the tool. This improved drill constitutes our present invention.

The method of making the drill constitutes the subject-matter of a separate application, Serial No. 529,393, filed November 22, 1909, of which this application is a division.

In the accompanying drawings, which illustrate the drill and the several steps followed in producing it.—Figure 1 is a view of the complete drill, part of the lower end of the shank being in section; Fig. 2 is a partial central longitudinal section through the lower end of the shank, showing the first step in the manufacture of the drill; Fig. 3 is an end view of the lower end of the shank at the stage shown in Fig. 2; Fig. 4 is a partial central longitudinal section through the lower end of the shank, showing the second step; Figs. 5 and 6 are similar views showing, respectively, the next two steps in the manufacture of the drill; Fig. 7 is a view of the lower end of the shank at the stage of its manufacture illustrated in Fig. 5; and Fig. 8 is a cross-section on line 8—8 of Fig. 1, looking up.

Referring to the drawings,—9 indicates the drill proper or cutting part of the drill, which is made of a twisted flat bar of high-speed steel having a straight portion 10 at its upper end, as shown.

11 indicates the shank, which, in the construction shown, is tapered in the usual form to fit a chuck or other holder. The shank 11 is made of ordinary steel or other suitable material.

In manufacturing the drill the lower end of the shank is first bored centrally to form a cylindrical recess 12 which is of less diameter than the width of the straight portion 10 of the drill and of somewhat greater depth than the length of that portion of the drill that is to be inserted in it. For example, if the drill is to be inserted in the shank to a depth of one inch, the socket is made about one and one-quarter inches deep. The next step is to bore a hole transversely through the shank so as to intersect the socket 12 at the bottom, as shown at 13 in Fig. 4. After this is done two grooves 14 are formed in the sides of the recess 12, said grooves being the width of the drill proper so that the straight portion of the drill may be fitted in them. These grooves are formed by cutting from the lower end of the shank, and the purpose of the transverse passage 13 is to enable such grooves to be extended to the proper depth and to be cut uniformly from end to end. After the grooves 14 have been formed, a plug 15 is inserted in the transverse hole or passage 13 to fill said passage completely, as shown in Fig. 6. At this stage of manufacture the ends of the plug 15 may project slightly beyond the ends of the sides of the shank, as shown, since they are readily smoothed off flush with the surface of the shank when the drill is finished. The shank is now ready to receive the drill, which is inserted in the groove 14, its upper end abutting against the pin 15, as shown in Fig. 1, and its side edges fitting tightly in the groove 14, as shown in Fig. 8. When the parts are assembled in the manner described, spaces 16 remain at opposite sides of the drill, as shown in Fig. 8. The parts are then secured together permanently by brazing, the brazing compound being applied to the grooves and engaging surfaces of the drill and socket. The drill is then heated to fuse the brazing compound which runs along the points of contact of the surfaces and firmly unites the drill with the shank and also firmly secures the pin 15 in place. The drill is then ready for finishing, which consists in smoothing the ends of the pin 15 and polishing the surfaces.

It will be seen that by proceeding in the manner described the drill proper is fixedly secured in the socket and is brazed thereto so that it cannot become displaced, and this is accomplished without cutting entirely through the shank transversely as has heretofore been the practice. We thus preserve the strength of the original material composing the shank and render unnecessary the application to the shank of a strengthening hoop or band, as has heretofore been necessary in order to secure the requisite strength to prevent the drill from becoming loosened by the severe twisting strains to which it is subjected. As a matter of fact, the securing of the drill in place by such bands is not satisfactory as they are apt to stretch and the drill soon becomes loosened. Furthermore, by providing the spaces 16 by our improved method of construction the contacting surfaces of the drill and shank are comparatively restricted in area, a considerable portion of the surface of the drill being out of contact with the shank. This is an important advantage as, owing to the unequal expansion and contraction of the two kinds of metal used, it is desirable that the contacting surfaces be as limited as possible as otherwise they are apt to become loosened.

It will be understood that the term "drill" as herein employed is used in a generic sense, and is intended to comprehend not only drills, strictly speaking, but also reamers and other analogous tools.

That which we claim as our invention, and desire to secure by Letters Patent, is,—

1. A cutting or boring tool, comprising a shank having a recess in its lower end provided with grooves to receive the edges of a drill, and a drill fitted in said grooves and fixedly secured to the shank.

2. A cutting or boring tool, comprising a shank having a recess in its lower end provided with grooves to receive the edges of a drill, a plug secured in the shank and extending transversely through the inner portion of said recess, and a drill fitted in said grooves and fixedly secured to the shank.

3. A cutting or boring tool, comprising a shank having a cylindrical recess in its lower end provided with grooves at its sides to receive the edges of a drill, and a drill substantially rectangular in cross-section fitted in said grooves.

4. A composite drill composed of a shank and a drill having different coefficients of expansion, said shank having a recess of greater diameter than the thickness of the drill and having grooves to receive the edges of the drill.

5. A composite drill composed of a shank and a drill having different coefficients of expansion, said shank having a recess of greater diameter than the thickness of the drill and having grooves to receive the edges of the drill, the drill and shank being brazed together.

MERTON L. HANLIN.
     EDWIN B. ROSS.

Witnesses:
 ALONZO F. HOWE,
 CHARLES F. PEARS.